(No Model.)
R. D. HUME.
CAN LACQUERING MACHINE.
No. 489,903. Patented Jan. 10, 1893.
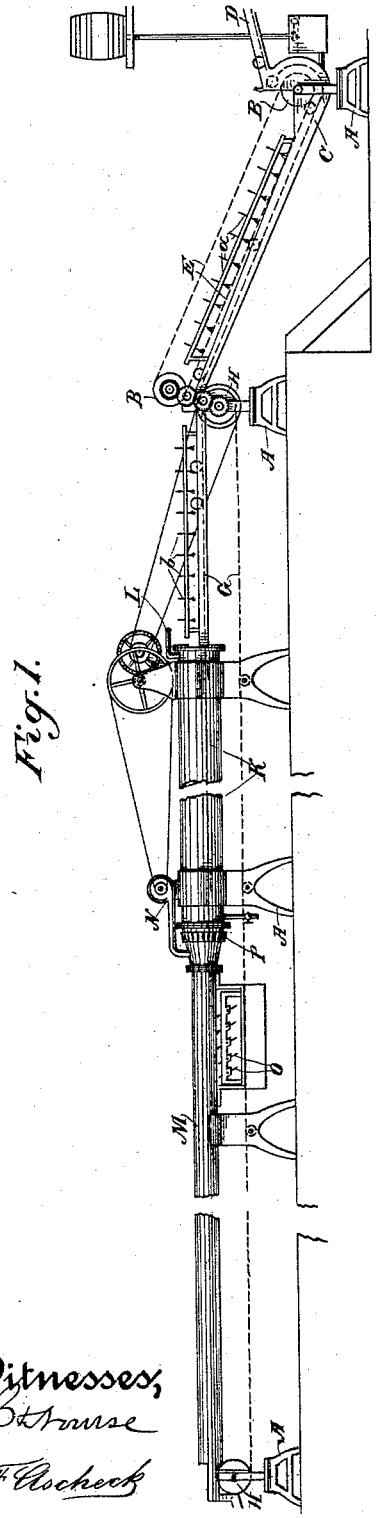
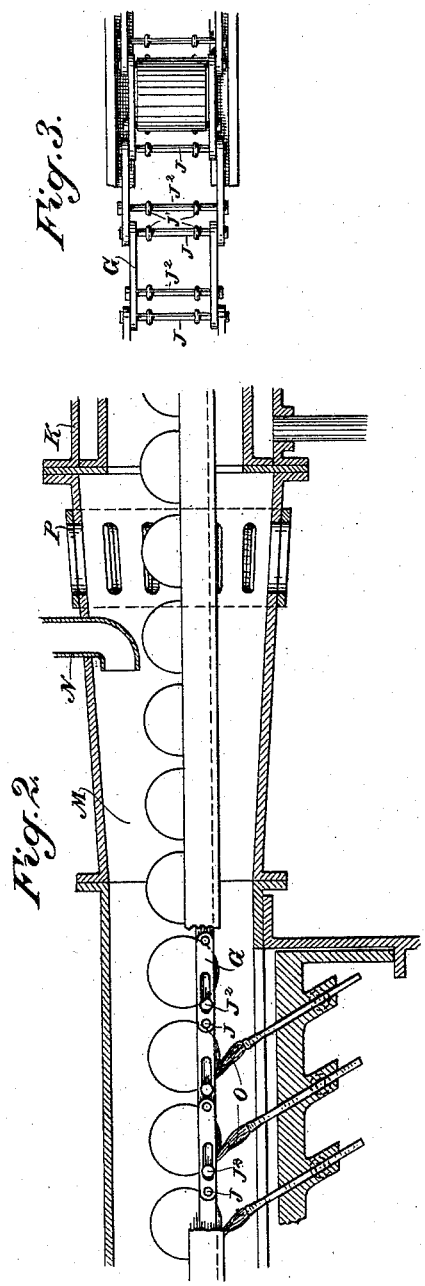
Witnesses:
Inventor,
Robert D. Hume
By Dewey & Co.
Attys

UNITED STATES PATENT OFFICE.

ROBERT D. HUME, OF GOLD BEACH, OREGON.

CAN-LACQUERING MACHINE.

SPECIFICATION forming part of Letters Patent No. 489,903, dated January 10, 1893.

Application filed November 10, 1892. Serial No. 451,549. (No model.)

*To all whom it may concern:*

Be it known that I, ROBERT D. HUME, a citizen of the United States, residing at Gold Beach, Curry county, State of Oregon, have invented an Improvement in Can-Lacquering Machines; and I hereby declare the following to be a full, clear, and exact description of the same.

My invention relates to an apparatus which is adapted to apply lacquer to the exterior surfaces of cans containing hermetically sealed goods, the lacquer being applied after the cans are filled and sealed for the purpose of giving the proper finish to them.

It consists in certain details of construction which will be more fully explained by reference to the accompanying drawings, in which—

Figure 1 is a general view of my machine. Fig. 2 is a longitudinal vertical cross section through the end of the heating drum, the register and the cooling chamber with brushes. Fig. 3 is a plan view of the chain.

A are standards or supports of any suitable character upon which the parts of the apparatus are mounted. Upon the support are journaled two chain-wheels B, one being considerably lower than the other.

C is a trough containing the lacquer which is to be applied to the cans, and D is a chute through which the cans are delivered to the lower end of this trough. The lower end of the trough C is shaped approximately to the curvature of the exterior of the chain-wheel B, so that as the cans roll down the chute D they will be delivered into the curved end of the lacquer trough, following its curvature until they arrive at the lowest point, which is approximately beneath the center of the carrying wheels B. The lacquer may be delivered into this trough in any suitable manner. I have found that a very suitable way of doing this, is to lead it from the cask, or other containing vessel into a chamber at a lower level by means of a pipe, and using a stop-cock with a lever and a float by which the cock is opened when the amount of lacquer in the chamber is reduced, and is closed by the rising of the ball when there is a sufficient amount in the chamber. A pipe from this chamber leads directly into the lacquer trough, and thus supplies the lacquer as fast as it becomes exhausted, and no more is exposed to the action of the air than is necessary for the work.

E is an endless chain passing around the wheels B. This chain is composed of two sets of jointed side bars connected together by transverse pins between which the cans are carried and delivered from the chute D.

Power is applied from any suitable source to rotate the wheels B, and cause the chain E to travel upward from the lacquer trough C, the cans being delivered from the upper end of the trough.

In order to remove any surplus lacquer from the cans, I have shown a line of brushes $a$ fixed to a suitable support so that the brushes may either be removed separately for cleansing, or the support with the series of brushes may be taken out, and another one substituted. As the cans pass beneath these brushes the surplus lacquer upon the cans will be removed. From the upper end of the lacquer trough they are delivered upon a second carrying belt G. This belt is composed of a pair of endless chains passing around pulleys H and traveling in an approximately horizontal position. Between the sides of the chain are transverse pins J which unite the ends of each pair of links and the intermediate pins $J^2$. These pins are turned with projecting flanges J', and when the cans are delivered from the first chain E they fall upon these flanges of the pins J and $J^2$ which thus support them with the smallest possible points touching the sufficiently lacquered surface. The ends of the pins $J^2$ pass through slots in the side bars of the chain, and they are held at any point by clamping ends, so that they may be adjusted to suit the size of the cans which are being treated. The cans delivered upon this chain then rest upon the flanges J' and in order to further relieve the cans of any superfluous lacquer which may still remain upon them, I have shown another series of brushes $b$, beneath or above which the cans pass during their travel over this portion of the apparatus.

K is a drying drum which consists of a double casing surrounding the carrying chain for a considerable distance, the inner casing being open at both ends to allow the chain and cans to enter and pass out. The exterior casing is closed, and steam is admitted into the annular space between the two through an inlet pipe $L^x$ and the water of condensation is discharged by a pipe at the opposite end of the casing. From this portion of the casing, which may be as long as is found necessary or desirable, the cans pass into another casing M through which a blast of air is delivered from any suitable fan or blast apparatus as shown at N. In the present case I have shown this blast of air as being delivered so as to travel in the same direction with the cans, but it will be manifest that it may be reversed and travel in the opposite direction if found desirable.

P is a register or other means for admitting air at a point between the drying drum or casing and the one in which the blast acts to cool the cans. This register is opened or closed to regulate the temperature within the casing M as may be desired, during the cooling process.

In order to cleanse the cans of any small amount of superfluous lacquer which may still remain upon them, and which during the travel through the horizontal portions of the apparatus will have settled upon the lower surfaces of the cans, I have shown a final series of cleansing brushes O supported in a suitable frame, so that they may be removed from time to time to be themselves cleansed. These brushes project up into the cooling tube through which the air-blast passes sufficiently to just brush over the lower surfaces of the cans as they pass.

The different movable parts of the apparatus may be driven from any suitable source of power by intermediate gearing as herein shown.

Having thus described my invention, what I claim as new and desire to secure by Letters Patent is—

1. An apparatus for lacquering cans, consisting of the inclined lacquer containing trough, supply chute and open-linked chains with driving pulleys by which the cans are immersed in a lacquer, and delivered from the upper end of the trough, in combination with a series of brushes beneath which the cans pass whereby the surplus lacquer is removed therefrom, substantially as herein described.

2. An apparatus for lacquering cans consisting of the inclined lacquer containing trough, a supply chute, an endless traveling open-linked chain passing around supporting and driving pulleys adapted to receive the cans and move them through the lacquer trough to the discharge end, a receiving belt consisting of endless chains having transverse pins with sharp edge flanges, upon which flanges the cans are received and supported, the drying chamber consisting of the inner and outer annular cylinders, the inner one having open ends through which the chain and cans pass and the outer one being closed and having steam supply and discharge pipes whereby it forms a steam jacket for the inner tube, substantially as herein described.

3. An apparatus for lacquering cans consisting of the inclined lacquer containing trough, endless open-linked carrying chains dipping into said trough, chutes by which the cans are delivered to the lower end of the trough between the links of the chain by which they are carried to the upper and discharge end, a second belt consisting of open-linked chains having transversely adjustable pins with raised flanges upon which the cans are received, an inclosed annular drying chamber through which the carrying chain passes, a second cylindrical chamber forming a continuation of the drying chamber, an air-blast apparatus and pipes leading from said air-blast into the second cylindrical chamber whereby the cans are cooled while passing through said chamber, and a series of brushes situated at intervals with relation to the carrying chains whereby the surplus lacquer is removed from the cans as they pass, substantially as herein described.

4. An apparatus for lacquering cans consisting of an inclined lacquer containing trough, endless open-link chains by which the cans are passed through the lacquer and then transmitted through successive drying and cooling chambers, brushes situated at intervals with reference to the transmitting chains, whereby the surplus lacquer is removed from the cans, an air-blast apparatus and a pipe delivering air therefrom into the cooling chamber, and gate controlled openings between the drying and cooling chambers, whereby a regulated amount of air is admitted to the cooling chamber independent of that supplied from the blast apparatus, substantially as herein described.

In witness whereof I have hereunto set my hand.

ROBERT D. HUME.

Witnesses:
S. H. NOURSE,
GEO. H. STRONG.